US012773767B2

(12) United States Patent
Taylor et al.

(10) Patent No.: US 12,773,767 B2
(45) Date of Patent: Oct. 27, 2026

(54) APPARATUS FOR DRIVING FASTENERS

(71) Applicant: Illinois Tool Works Inc., Glenview, IL (US)

(72) Inventors: Walter Taylor, McHenry, IL (US); Graeme Young, Cooks Beach (NZ); Sandeep Patel, Auckland (NZ)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 18/642,501

(22) Filed: Apr. 22, 2024

(65) Prior Publication Data

US 2024/0375257 A1 Nov. 14, 2024

Related U.S. Application Data

(60) Provisional application No. 63/501,920, filed on May 12, 2023.

(51) Int. Cl.

*B25C 1/08* (2006.01)
*B25C 1/00* (2006.01)
*B25C 7/00* (2006.01)

(52) U.S. Cl.

CPC ................ *B25C 1/08* (2013.01); *B25C 1/001* (2013.01); *B25C 7/00* (2013.01)

(58) Field of Classification Search

CPC .. B25C 1/08; B25C 1/001; B25C 7/00; B25C 1/188; B25C 1/047; B25C 1/003

See application file for complete search history.

(56) References Cited

U.S. PATENT DOCUMENTS 3,854,648 A * 12/1974 Inzoli ...................... B25C 1/003 227/136
4,721,170 A 1/1988 Rees
4,928,868 A 5/1990 Kerrigan
5,069,379 A 12/1991 Kerrigan
5,201,449 A 4/1993 Miller
5,238,167 A * 8/1993 Howard .................... B25C 7/00 227/119
5,263,626 A 11/1993 Howard et al.
5,452,835 A * 9/1995 Shkolnikov ............. B25C 1/047 227/119
5,649,660 A 7/1997 Akiba et al.

(Continued)

FOREIGN PATENT DOCUMENTS

EP 1894679 A2 3/2008

OTHER PUBLICATIONS

Extended European Search Report from European Application No. 24174991.0, dated on Oct. 10, 2024 (10 pages).

*Primary Examiner* — Thomas M Wittenschlaeger
*Assistant Examiner* — Katie L Gerth
(74) *Attorney, Agent, or Firm* — Adam H. Masia

(57) ABSTRACT

An apparatus for driving fasteners including a cylinder, a driving piston arranged for driving a fastener from the apparatus into a substrate, the piston being arranged for reciprocating movement relative to the cylinder, a charge supply for feeding a charge to a combustion chamber of the cylinder where the charge is combusted to drive movement of the piston relative to the cylinder, a coil feed of fasteners, and a guidance system configured to guide the apparatus relative to the substrate, the guidance system including a positive placement system.

12 Claims, 12 Drawing Sheets

(56) References Cited

U.S. PATENT DOCUMENTS

| | | | | | |
|---|---|---|---|---|---|
| 5,810,239 | A * | 9/1998 | Stich | B25C 7/00 | 227/123 |
| 6,279,808 | B1 * | 8/2001 | Larsen | B25C 1/00 | 227/123 |
| 6,578,749 | B1 * | 6/2003 | Shen | B25C 1/003 | 227/123 |
| 6,695,192 | B1 | 2/2004 | Kwok | | |
| 6,789,718 | B2 * | 9/2004 | Canlas | B25C 7/00 | 227/107 |
| 6,808,101 | B2 * | 10/2004 | Laubach | B25C 5/1658 | 227/119 |
| 6,866,177 | B1 | 3/2005 | Chen | | |
| 6,959,850 | B2 | 11/2005 | Taylor et al. | | |
| 6,964,362 | B2 | 11/2005 | Shkolnikov et al. | | |
| 6,986,448 | B2 | 1/2006 | Lat et al. | | |
| 7,017,790 | B1 * | 3/2006 | Peng | B25C 1/188 | 227/139 |
| 7,213,732 | B2 | 5/2007 | Schell et al. | | |
| 7,303,103 | B2 | 12/2007 | Wang | | |
| 7,318,546 | B2 | 1/2008 | Segura et al. | | |
| 7,506,787 | B2 | 3/2009 | Wu et al. | | |
| 7,516,876 | B2 * | 4/2009 | Ohmori | B25C 1/08 | 227/119 |
| 7,628,304 | B2 * | 12/2009 | Yamamoto | B25C 7/00 | 227/119 |
| 7,757,920 | B2 | 7/2010 | Shea et al. | | |
| 8,220,687 | B2 * | 7/2012 | Yamamoto | B25C 5/1603 | 227/8 |
| 8,276,798 | B2 | 10/2012 | Moeller et al. | | |
| 8,292,143 | B2 | 10/2012 | Lee et al. | | |
| 8,631,986 | B2 | 1/2014 | Hlinka et al. | | |
| 8,827,132 | B2 | 9/2014 | Mina et al. | | |
| 9,114,516 | B2 | 8/2015 | Porth | | |
| 9,486,906 | B2 | 11/2016 | Zhao et al. | | |
| 9,527,196 | B2 * | 12/2016 | Segura | B25C 1/005 | |
| 10,350,741 | B2 * | 7/2019 | Brendel | B25C 1/001 | |
| 10,987,791 | B2 * | 4/2021 | Lee | B25C 7/00 | |
| 11,077,542 | B2 * | 8/2021 | Waterman | B25C 1/00 | |
| 2003/0218044 | A1 * | 11/2003 | Laubach | B25C 5/1658 | 227/120 |
| 2005/0045688 | A1 | 3/2005 | Chen | | |
| 2006/0112580 | A1 | 6/2006 | Dekeyser | | |
| 2007/0215665 | A1 * | 9/2007 | Ohmori | B25C 1/08 | 227/119 |
| 2008/0251559 | A1 | 10/2008 | Uejima et al. | | |
| 2008/0277446 | A1 * | 11/2008 | Yamamoto | B25C 1/041 | 227/139 |
| 2010/0308098 | A1 | 12/2010 | Francis et al. | | |
| 2011/0062209 | A1 * | 3/2011 | Vallon | B25C 1/00 | 227/110 |
| 2013/0020371 | A1 * | 1/2013 | Porth | B25C 1/08 | 227/8 |
| 2013/0299546 | A1 | 11/2013 | Zhao et al. | | |
| 2024/0017389 | A1 * | 1/2024 | Shioya | B25C 1/008 | |
| 2024/0342887 | A1 * | 10/2024 | Taylor | B25C 1/008 | |
| 2026/0014686 | A1 * | 1/2026 | Taylor | B25C 1/008 | |

* cited by examiner

APPARATUS FOR DRIVING FASTENERS

PRIORITY

This application claims priority to and the benefit of U.S. Provisional Patent Application Ser. No. 63/501,920, filed May 12, 2023, the entire contents of which are incorporated herein by reference.

FIELD

The present disclosure relates to an apparatus for driving fasteners. More particularly, various embodiments of the present disclosure relate to nail driving apparatus such as nail driving apparatus that are powered by combustion or pneumatically and fed with a coiled storage of fasteners or otherwise. The nail driving apparatus can be but is not limited to the type used for fastening cladding to a structure.

BACKGROUND

It is known to fasten fibre cement cladding to a structure by drilling a hole through the fibre cement board's layers. The fibre cement cladding is then face fixed by hand hammering and is later filled with a filler compound. It is also known to fasten decorative cladding (such as natural timbers) by drilling a hole through the decorative cladding and by carefully hand hammering a fastener through the hole to avoid marring or otherwise damaging the timber. Any damage to the cladding, in particular where the cladding is decorative cladding, can result in the whole cladding board needing to be replaced. These known methods are time-consuming and inefficient, and hand hammering can sometimes damage the fibre cement board. Thus, there is a need for more efficient ways of fastening cladding with increased speed and decreased likelihood of damage.

SUMMARY

Various embodiments of the present disclosure provide an apparatus for driving fasteners that alleviates or at least ameliorates one or more disadvantages of existing methods and apparatuses used in fastening cladding.

Various embodiments of the present disclosure provide an apparatus for driving fasteners that includes a housing, a cylinder in the housing, a driving piston in the housing and arranged for driving a fastener from the apparatus into a substrate, the piston being arranged for reciprocating movement in the housing relative to the cylinder, a charge supply in the housing for feeding a charge to a combustion chamber of the cylinder where the charge is combusted to drive movement of the piston relative to the cylinder. In various such embodiments, the apparatus includes a guidance system connected to the housing and configured to guide the apparatus relative to the substrate. In various such embodiments, the guidance system is in the form of a positive placement system. In various such embodiments, the positive placement system includes a retractable probe configured to be placed on a receiving location for locating the apparatus relative to the substrate, and wherein the retractable probe is configured to subsequently retract to make way for a fastener to be driven at the receiving location. In various such embodiments, the probe is configured to clear a raceway of the apparatus, thereby making way for the fastener to be driven. In various such embodiments, the positive placement system includes a mechanism configured to progressively move the probe rearward toward the housing and then upward for avoiding damage to the substrate and for aligning the raceway with a center of a hole for receiving the fastener. In various such embodiments, the fasteners are stored in a coil formation in a housing of the coil feed.

Various other embodiments of the present disclosure provide an apparatus for driving fasteners, wherein the apparatus includes a guidance system connected to the housing and for guiding the apparatus relative to the substrate, wherein the guidance system is in the form of a positive placement system, the positive placement system includes a retractable probe configured to be placed on a receiving location of a substrate for locating the apparatus relative to the substrate, and wherein the retractable probe is configured to subsequently retract toward the housing to make way for the fastener to be driven at the receiving location. In various such embodiments, the probe is configured to clear a raceway of the apparatus, thereby making way for the fastener to be driven. In various such embodiments, the guidance system is configured to place a nail in an exact location where the probe once was at the time of initial abutment with the substrate. In various such embodiments, the positive placement system includes a mechanism configured to progressively move the probe rearward then upward for avoiding damage to the substrate and for aligning the raceway with a center of a hole for receiving the fastener.

DETAILED DESCRIPTION

Figure 1:
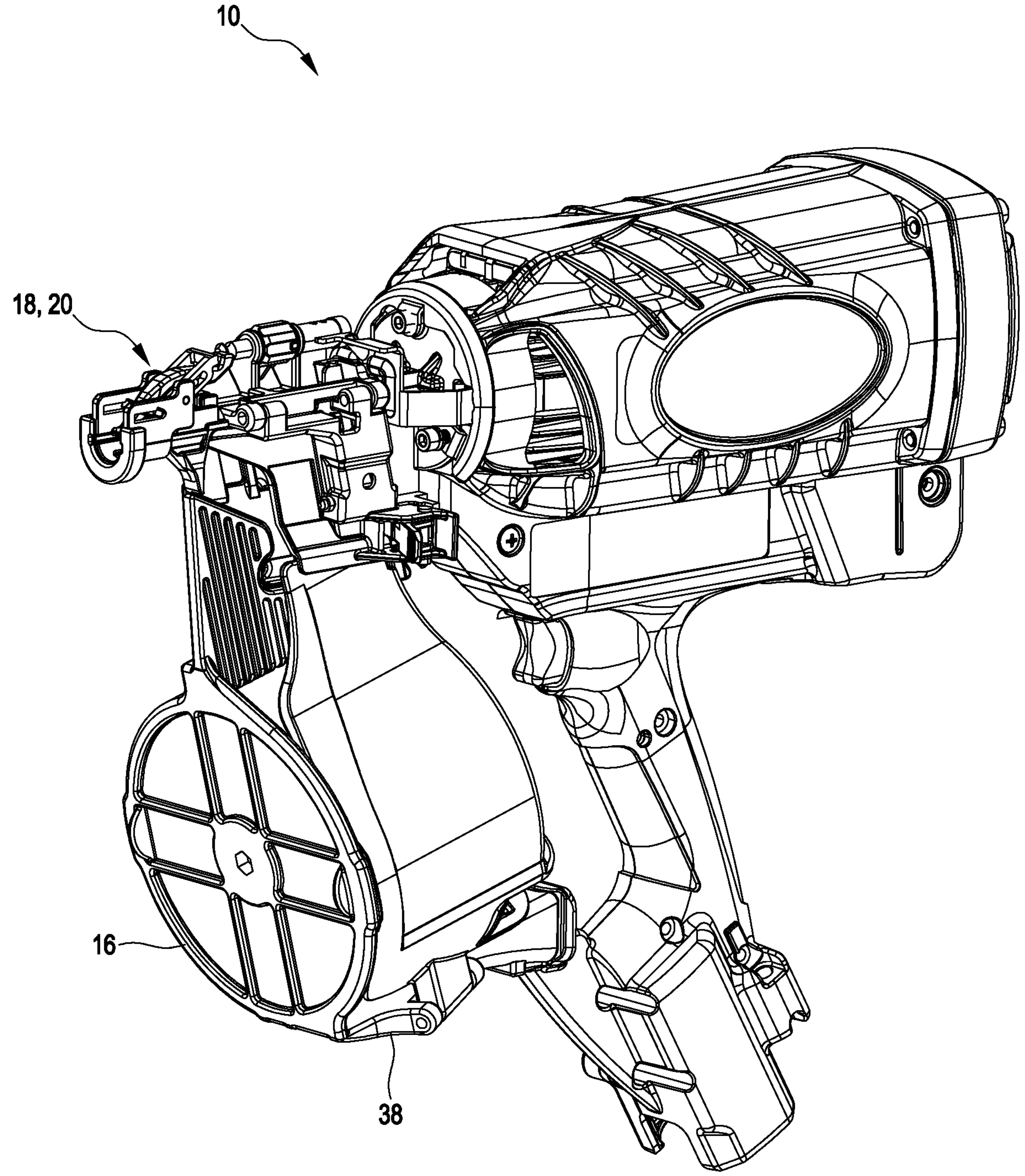
FIG. 1 is a perspective view of an apparatus for driving fasteners in accordance with one example embodiment of the present disclosure.
Figure 2:
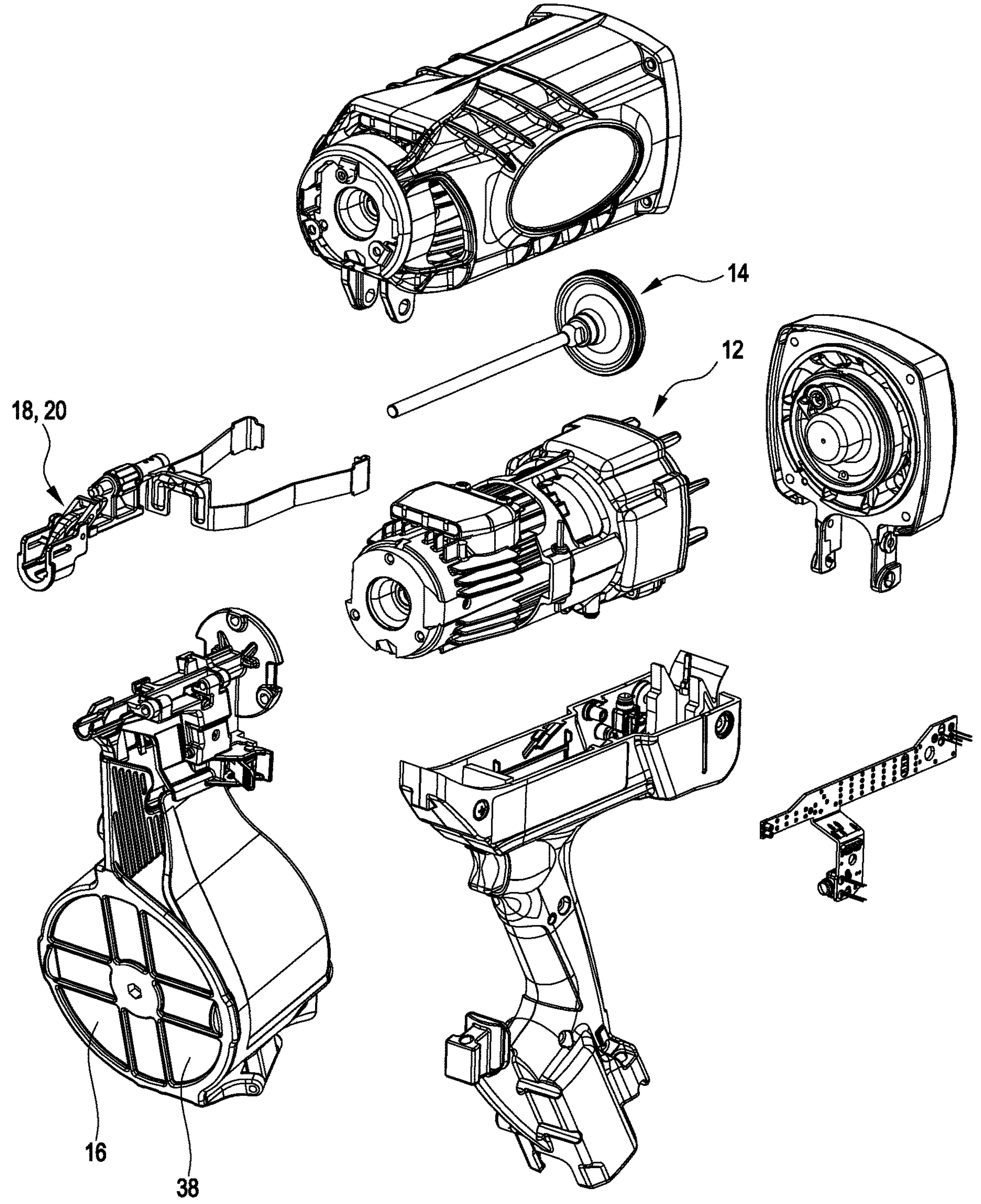
FIG. 2 is an exploded perspective view of the apparatus of FIG. 1.

While the systems, devices, and methods described herein may be embodied in various forms, the drawings show, and the specification describes certain exemplary and non-limiting embodiments. Not all components shown in the drawings and described in the specification may be required, and certain implementations may include additional, different, or fewer components. Variations in the arrangement and type of the components; the shapes, sizes, and materials of the components; and the manners of connections of the components may be made without departing from the spirit or scope of the claims. Unless otherwise indicated, any directions referred to in the specification reflect the orientations of the components shown in the corresponding drawings and do not limit the scope of the present disclosure. Further, terms that refer to mounting methods, such as mounted, connected, etc., are not intended to be limited to direct mounting methods but should be interpreted broadly to include indirect and operably mounted, connected, and like mounting methods. This specification is intended to be taken as a whole and interpreted in accordance with the principles of the present disclosure and as understood by one of ordinary skill in the art.

FIGS. 1 to 8 show an apparatus 10 for driving fasteners in accordance with one example embodiment of the present disclosure. The apparatus 10 includes, among other conventional elements, a housing (not labelled), a cylinder 12 and a driving piston 14 in the housing and arranged for driving a fastener (not shown) from the apparatus 10 into a substrate. The piston 14 is arranged for reciprocating movement relative to the cylinder 12. The apparatus 10 also includes a charge supply in the housing for feeding a charge to a combustion chamber of the cylinder 12 where the charge is combusted to drive movement of the piston 14 relative to the cylinder 12. The apparatus 10 also includes a coil feed 16 connected to the housing and configured to hold and feed fasteners.

The apparatus 10 includes a guidance system 18 connected to the housing and for guiding the apparatus 10 relative to the substrate. The guidance system 18 is in the form of a positive placement system 20 for positively placing the apparatus 10 relative to the substrate such that the fastener being driven is accurately located relative to a desired receiving location (such as a hole).

The positive placement system 20 includes a retractable probe 22 that is configured to be placed on a receiving location to be fastened for locating the apparatus 10 relative to the substrate. The retractable probe 22 is configured to subsequently retract (such as shown in FIGS. 4*a* to 4*f*) to make way for the fastener to be driven at the receiving location. To facilitate such retraction, the retractable probe 22 includes a first crossbar 46 and a second crossbar 48.

Figure 3:
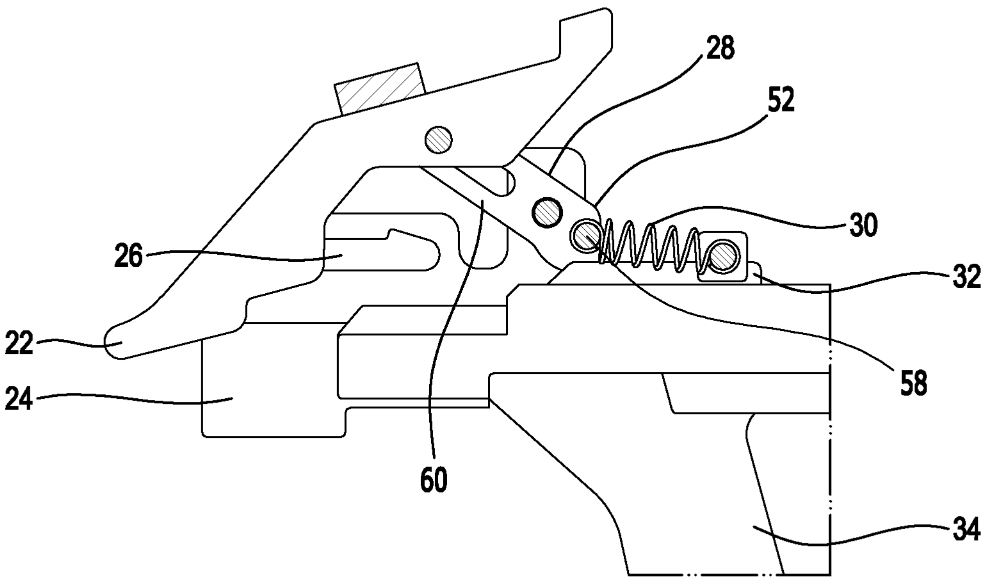
FIG. 3 is an enlarged fragmentary side view of a guidance system of the apparatus of FIG. 1.
Figure 4A:
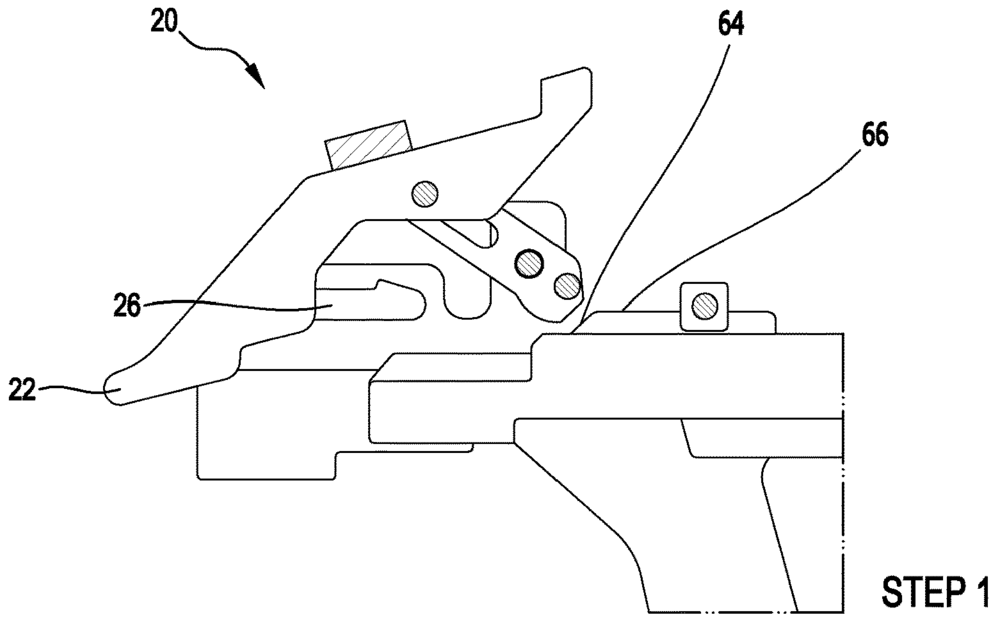
FIGS. 4*a* to 4*f* are fragmentary side views of progressive movements of the guidance system during operation and retraction of a probe of the apparatus of FIG. 1.

As best shown in FIG. 3, FIGS. 4*a* to 4*f*, and FIG. 5, the positive placement system 20 also includes a lower work contact 24, probe guides (not labelled) of the lower work contact 24 that each define a first slot 26 and a bore 50, a lever 28, a low-pressure spring 30, and a wedge 32. FIG. 3 also shows a nose casting 34. Since both slots 26 and both bores 50 are identical, only one slot 26 and one bore 50 are described herein for brevity. The lever 28 includes a body 52, a first protrusion 54 connected to a first surface 56 of the body 52, and a second protrusion 58 connected to a second surface 60 of the body 52 opposite the first surface 56. The first protrusion 54 is configured to be received by the bore 50 to enable the body 52 to pivot about the first protrusion 54. The second protrusion 58 is configured to connect to the spring 30. Additionally, the body 52 of the lever 28 defines a second slot 62 configured to receive the second crossbar 48 of the retractable probe 22 such that the second crossbar 48 is slidable in the second slot 62. As best shown in FIG. 4*a*, the wedge 32 includes a ramped surface 64 and a flat surface 66.

FIG. 4*a* shows step 1 of a six-step retraction process of the retractable probe 22, as the apparatus 10 is brought into contact with a substrate and prepared for driving so as to drive a fastener into the substrate at a desired receiving location. FIG. 4*a* shows the retractable probe 22 at its initial position.

Figure 4B:
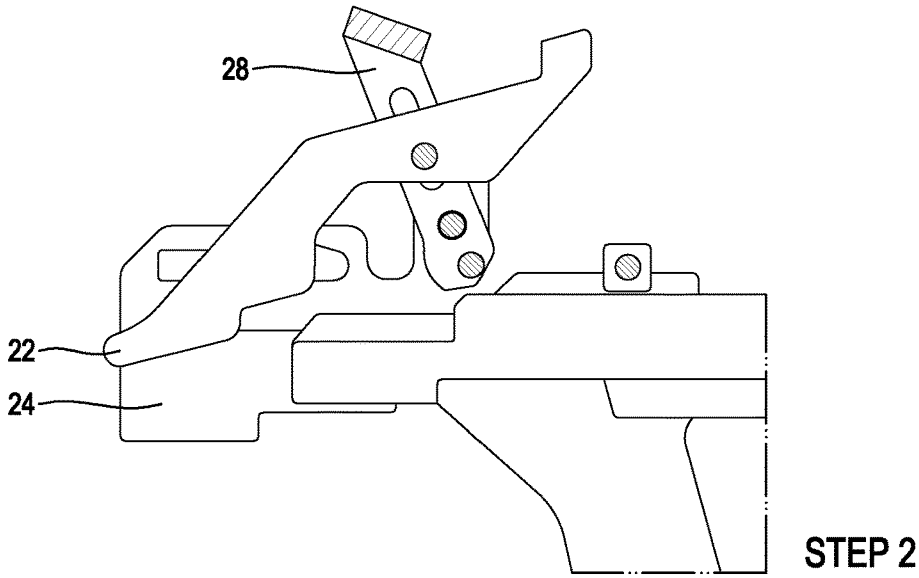

FIG. 4*b* shows step 2 of the six-step retraction process. In this step, after engaged in the hole, the retractable probe 22 moves to the right which is moving rearward toward the housing relative to the apparatus 10. The lower work contact 24 remains stationary.

Figure 4C:
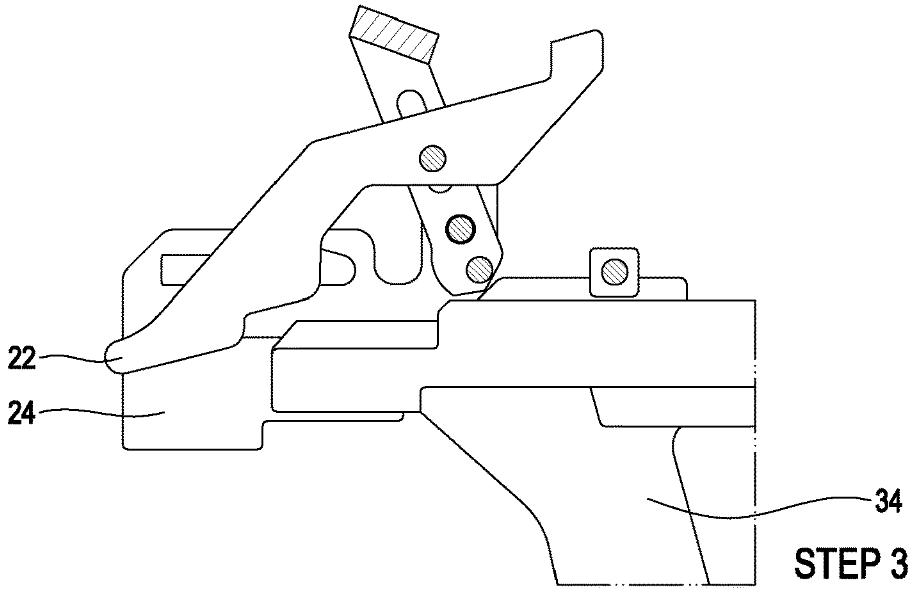

FIG. 4*c* shows step 3 of the six-step retraction process. In this step, when the apparatus 10 is actuated, the lower work contact 24 and probe 22 travel together in a rearward direction relative to the nose casting 34.

Figure 4D:
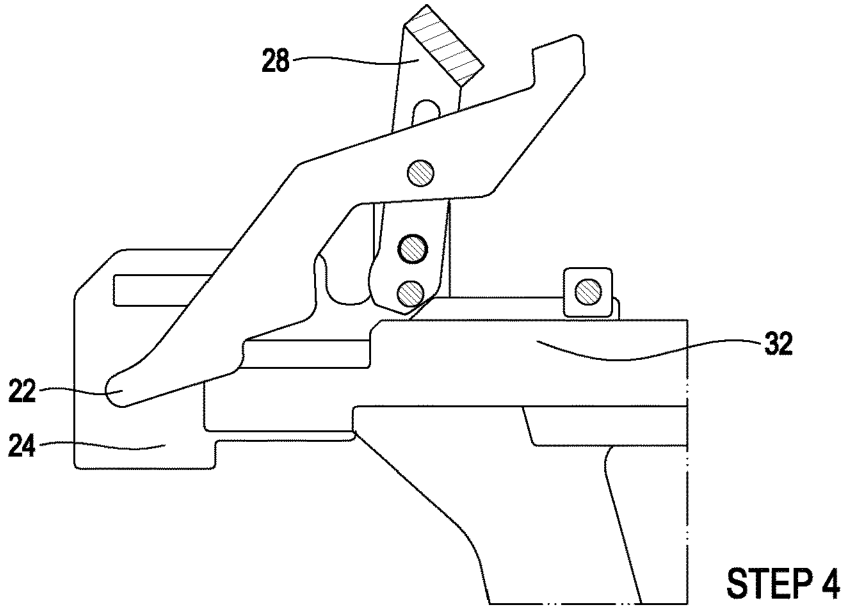

FIG. 4*d* shows step 4 of the six-step retraction process. In this step, the lower work contact 24 and probe 22 travel together until the lever 28 engages with the wedge 32 on the nose casting 34. At this point, the probe 22 will move further inwards.

Figure 4E:
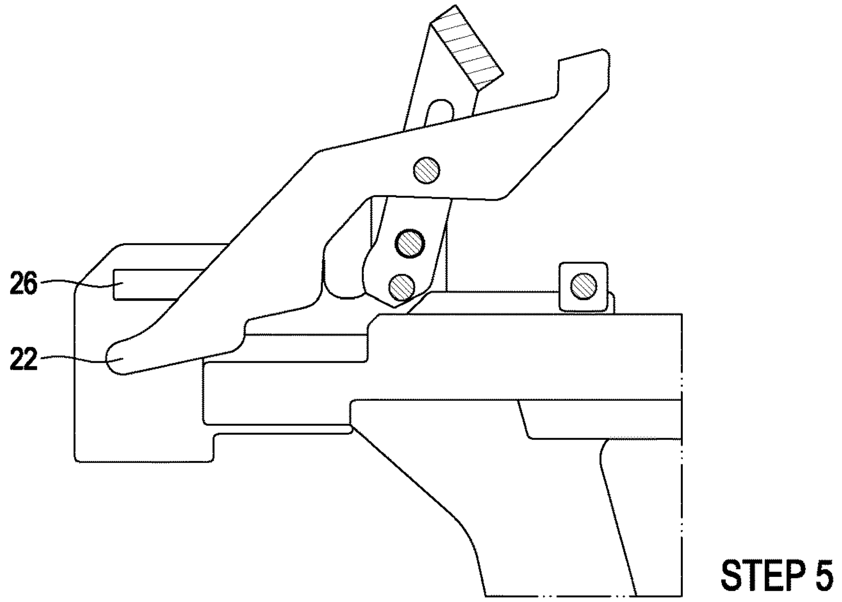

FIG. 4*e* shows step 5 of the six-step retraction process. In this step, the probe 22 will keep moving until it hits an end of the slot 26 defined in the probe guides. This will then enable the probe 22 to rotate upwardly.

Figure 4F:
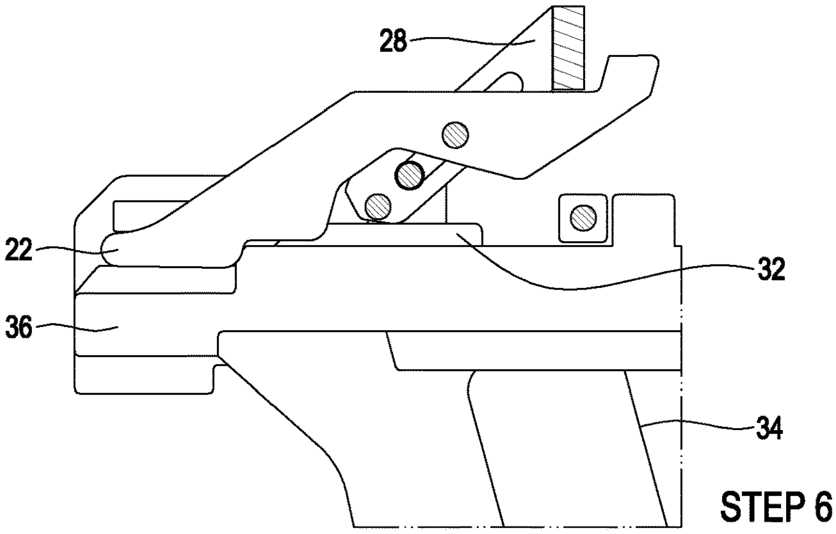
Figure 5:
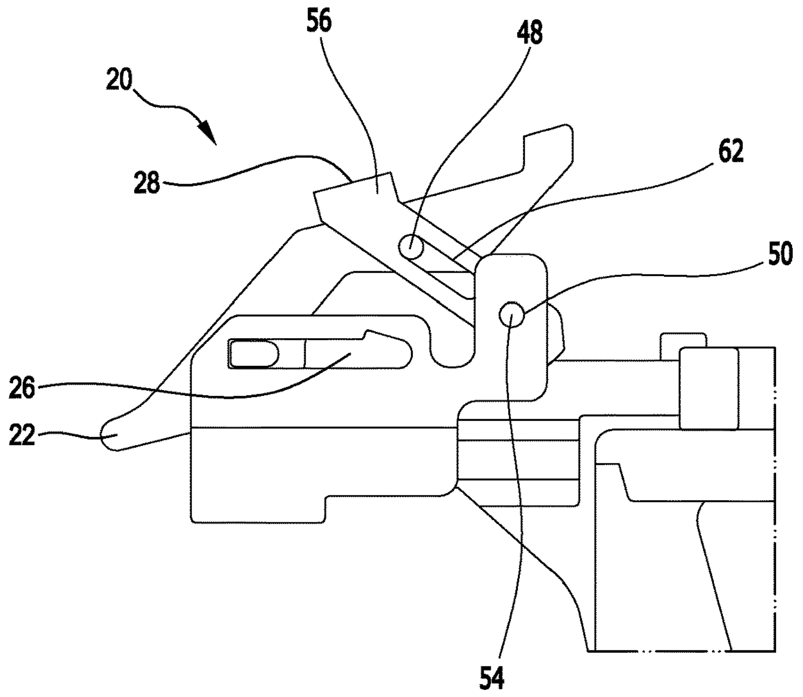
FIG. 5 is a fragmentary side view of the guidance system of the apparatus of FIG. 1.
Figure 6:
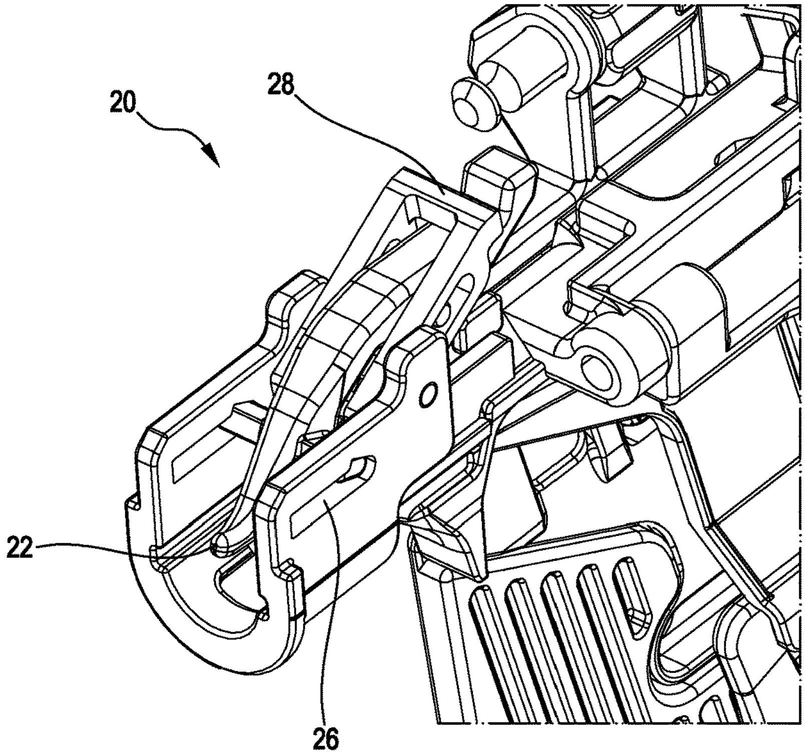
FIG. 6 is a fragmentary perspective view of the guidance system of the apparatus of FIG. 1.
Figure 7:
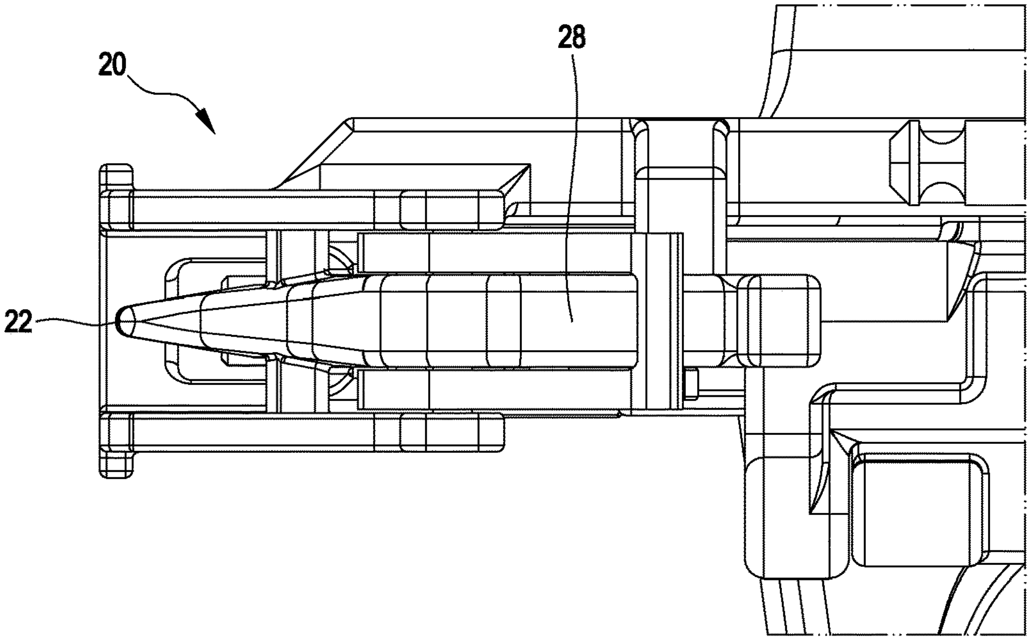
FIG. 7 is a fragmentary top view of the guidance system of the apparatus of FIG. 1.
Figure 8:
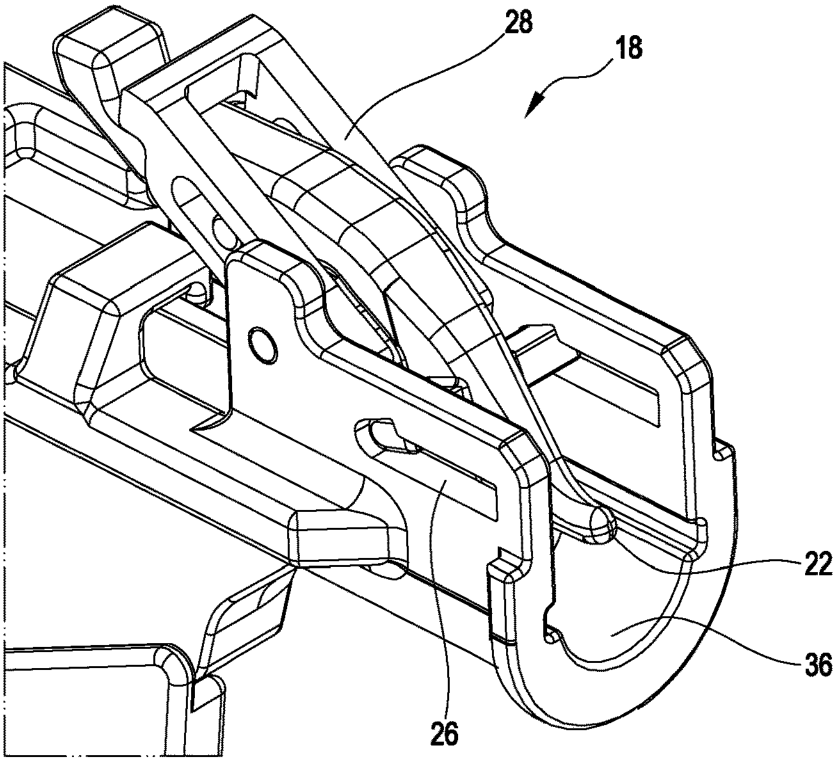
FIG. 8 is a fragmentary opposite side perspective view of the guidance system of the apparatus of FIG. 1.

FIG. 4*f* shows step 6 of the six-step retraction process. In this step, as the apparatus 10 continues to be actuated, the lever 28 will glide over the wedge 32 on the nose casting 34 and continue to slide along it. At this stage, the probe 22 clears a raceway 36 for the fastener.

In this example embodiment of the apparatus 10, the fasteners are stored in a coil formation in a fastener housing 38 of the coil feed 16.

Accordingly, as will be appreciated from the above description with reference to FIGS. 4*a* to 4*f*, the probe 22 is configured to clear the raceway 36 of the apparatus 10, thereby making way for the fastener to be driven along the raceway 36 and into the substrate. The positive placement system 20 includes a mechanism (comprising the probe guides that each define the slot 26, lever 28, low-pressure spring 30 and wedge 32) to progressively move the probe 22 rearward then subsequently upward for avoiding damage to the substrate and for aligning the raceway 36 with a center of a hole for receiving the fastener.

As will further be appreciated from the above, the present disclosure provides an apparatus 10 for driving fasteners, wherein the apparatus 10 includes a guidance system 18 for guiding the apparatus 10 relative to the substrate. The guidance system 18 is in the form of a positive placement system 20. The positive placement system 20 includes the retractable probe 22 configured to be placed on a receiving location of a substrate to be fastened for locating the apparatus 10 relative to the substrate. The retractable probe 22 is configured to subsequently retract to make way for the fastener to be driven at the receiving location.

The retractable probe 22 is configured to clear the raceway 36 of the apparatus 10, thereby making way for the fastener to be driven. The positive placement system 20 includes a mechanism (comprising probe guides that each define a or the slot 26, lever 28, low-pressure spring 30, and wedge 32) to progressively move the probe 22 rearward then upward for avoiding damage to the substrate and for aligning the raceway 36 with a center of a hole for receiving the fastener.

Advantageously, the guidance system and the speed provided by examples of the present disclosure may be beneficial over existing technologies. In particular, most existing coil nailers are pneumatically powered. Therefore, they need a compressor and long hoses. Coil nailers do not have flagging issues caused by paper collation used on straight magazine nailers. Examples of the present disclosure may be unique as they are an impulse tool, being combustion powered. This eliminates the need for long hoses and compressors, therefore being potentially easier to manoeuvre. Examples of the present disclosure may also have a positive placement nailer guidance system for face fixing. This will enable accurate nail placement and no damage to the substrate being applied.

The positive placement nailer guidance system provides a positive location and the guidance system that is unique. Examples of the present disclosure locate the hole at the center and enable the probe to clear the raceway, without relying on a driven fastener contacting the probe to align the fastener to the hole. The mechanism of the guidance system results in a retractable action in two directions, being rearward and upward. These actions ensure that the probe will not damage the substrate material and that the raceway is aligned with a center of the hole.

This overcomes issues with various known guidance systems, that if modified for a coil nailer, may damage the hole during deflection when the fastener is driven. Such damage would require more work for the person doing the filling on fibre cement cladding, increasing time and cost.

Various embodiments of the present disclosure may be in the form of a coil nailer that has a larger magazine capacity compared to a straight magazine (for example, 200 nails vs 40 nails). Also, various known straight magazines have a paper collation that causes flagging (i.e., paper stuck to the material substrate). Paper flagging can cause moisture to sip into the material substrate, and an operator filling the holes will need to remove the paper before filling it. The coil can have a plastic collation that eliminates this issue.

Although the drawings show the fasteners in the form of nails, it should be appreciated that, in other examples of the present disclosure, the guidance system may be used for other applications such as with fastener driving apparatus that uses screws for timber decking.

Figure 9:
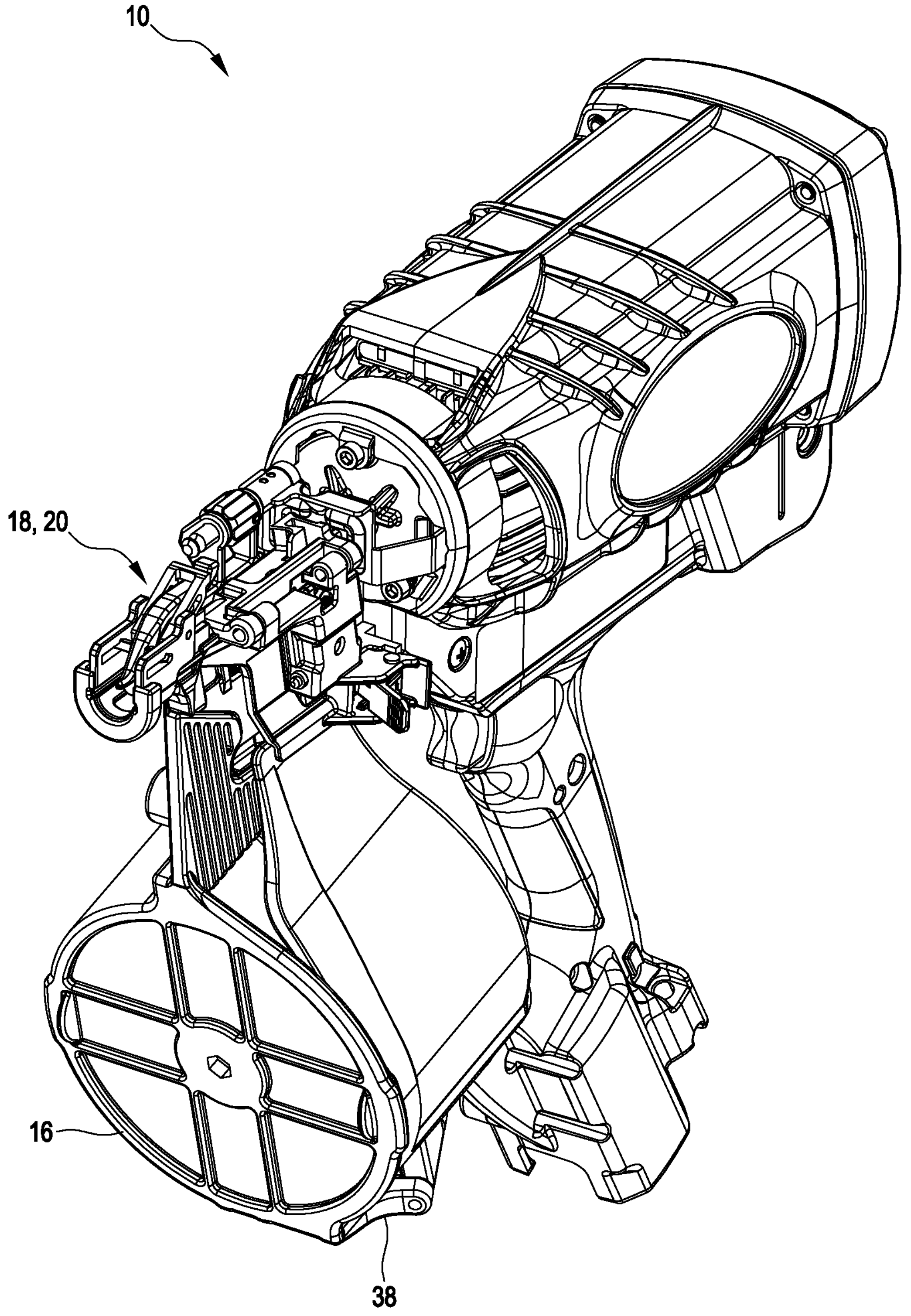
FIG. 9 is a perspective view of an apparatus for driving fasteners in accordance with another example embodiment of the present disclosure.
Figure 10:
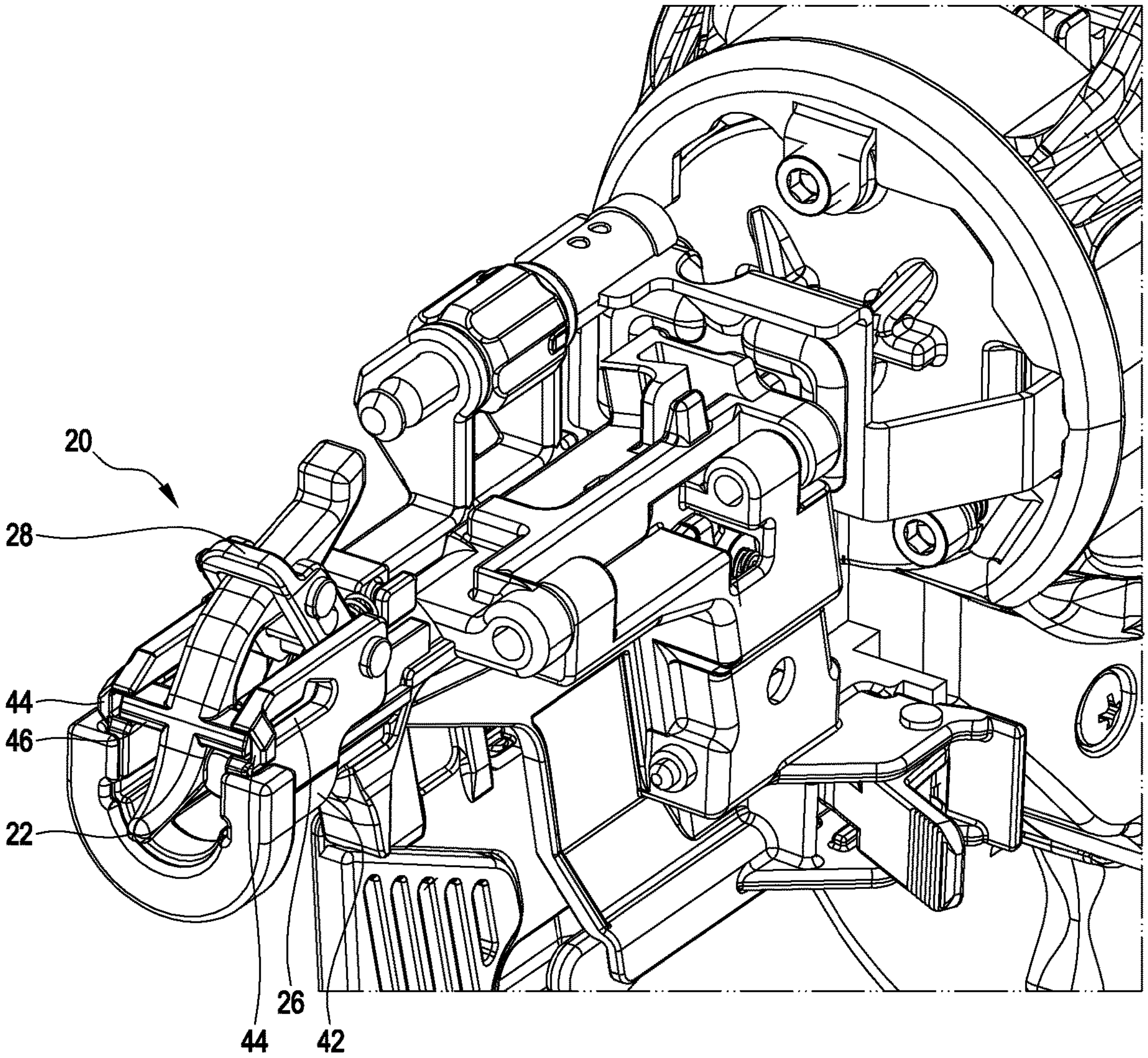
FIG. 10 is an enlarged fragmentary perspective view of the guidance system of the apparatus of FIG. 9.

FIGS. 9 to 11 show an apparatus 10 for driving fasteners in accordance with another example embodiment of the present disclosure. The apparatus 10 shown in FIGS. 9 to 11 is generally similar to the apparatus 10 shown in FIGS. 1 to 8, and like features are represented with like reference numerals. The apparatus of FIGS. 9 to 11 differs in the shape and configuration of the components of the guidance system 18. Specifically, the shape and configuration of the retractable probe 22 is different in that it has a more pronounced indentation 40 on a heel of a foot of the retractable probe 22 (as seen in FIGS. 11*a* to 11*d*). In addition, the slots 26 are formed in the probe guides (not labelled) of a carrier 42 that has outwardly protruding guiding ears 44 that form an entry to the slots 26 so as to accommodate a crossbar 46 of the retractable probe 22, wherein the crossbar 46 rides in the slots 26. The slots 26 have opposed slot parts on either side of the carrier 42. The shaping of the lever 28 also differs from the first embodiment shown in FIGS. 1 to 8.

Figure 11A:
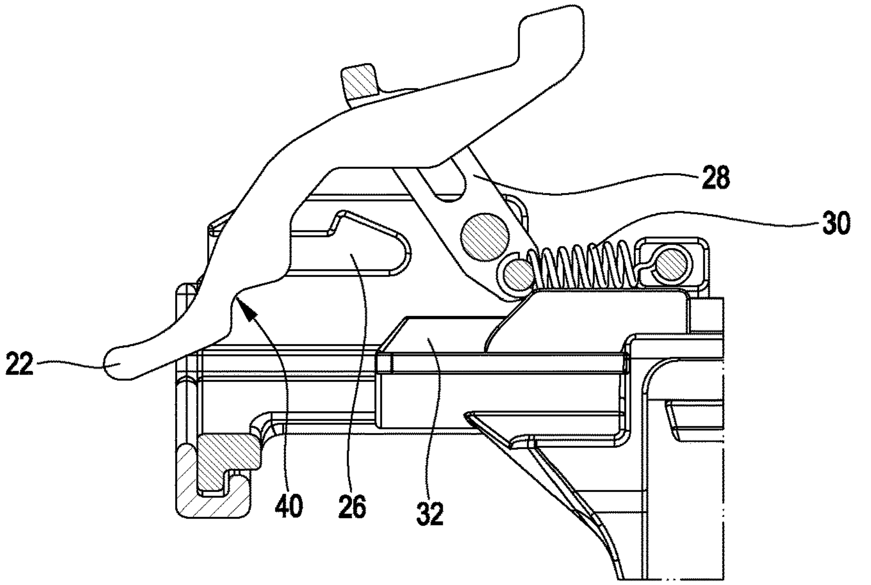
FIGS. 11*a* to 11*d* are enlarged fragmentary side views of progressive movements of the guidance system of the apparatus of FIG. 9 during operation and retraction of the probe thereof.
Figure 11B:
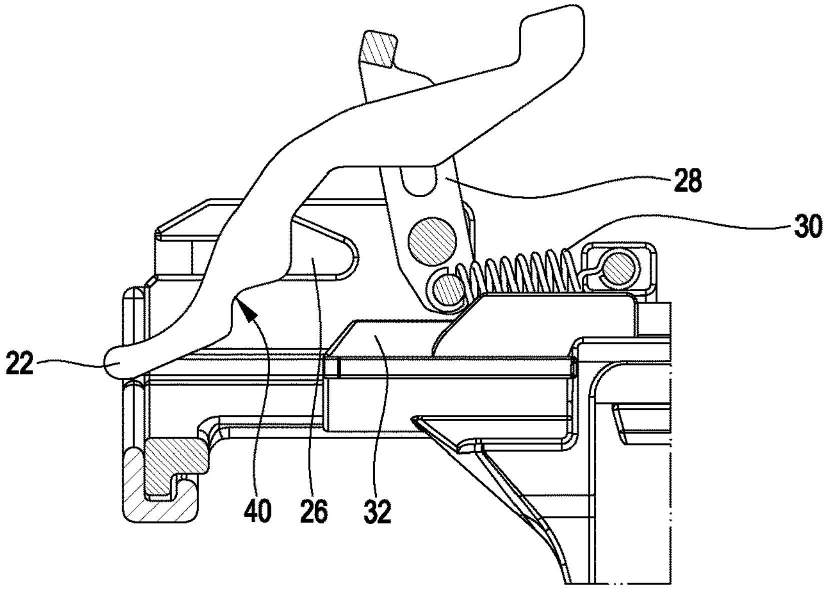
Figure 11C:
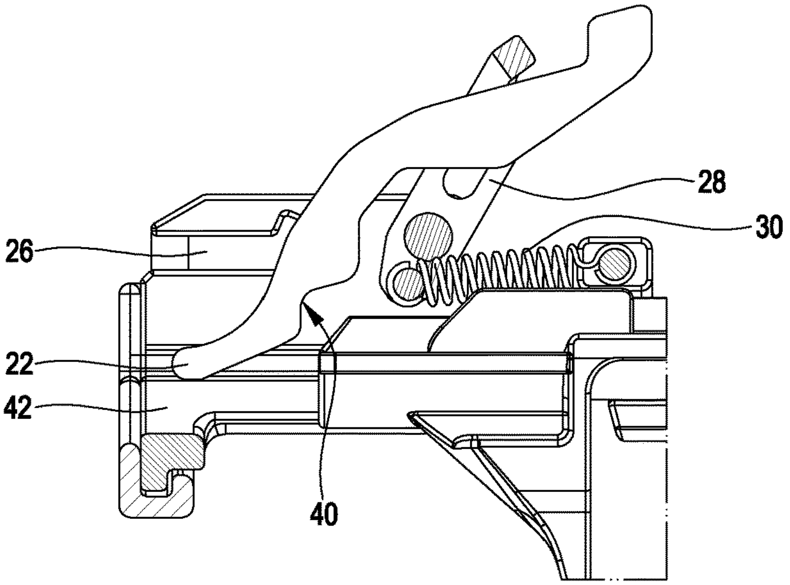
Figure 11D:
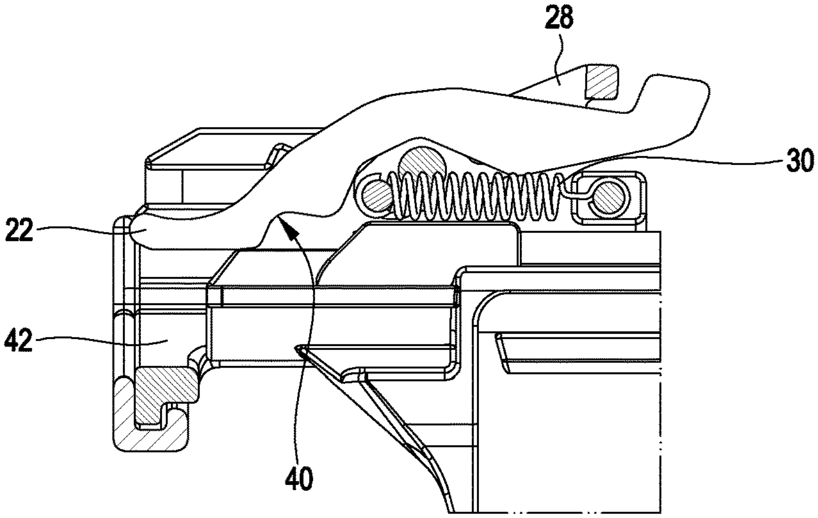

FIG. 9 shows a perspective view of the apparatus 10 for driving fasteners in accordance with this second embodiment of the present disclosure. FIG. 10 shows a perspective view of the guidance system of FIG. 9, depicting detail of the retractable probe 22, the crossbar 46, the carrier 42, and the protruding guiding ears 44. FIGS. 11*a* to 11*d* show progressive movements of the guidance system 18 during operation and retraction of the probe 22. In particular, the retractable probe 22 is initially pushed rearwardly into the carrier 42 as the retractable probe 22 is pressed against a workpiece or substate (e.g., such as panelling) to be fastened. FIG. 11*a* to FIG. 11*b* show that the retractable probe 22 is pushed inwardly into the carrier 42, with the retractable probe 22 sliding along the slots 26 by way of the crossbar 46, the lever 28 pivoting toward a vertical orientation to accommodate this movement. In FIG. 11*c*, the crossbar 46 is pushed to abut against the rearmost extremities of the slots 26 and the carrier 42 is pushed rearwardly toward a main body of the fastening tool, a foot of the retractable probe 22 coming into contact with a forward angled surface of the wedge 32. At this point, the retractable probe 22 rides upwardly onto an upper surface of the wedge 32 such that the retractable probe 22 is brought wholly out of the raceway 36 so as to totally clear the raceway 36.

Advantageously, this example embodiment of the present disclosure provides a positive placement system in which the retractable probe 22 is a true center probe, in that a tip of the retractable probe 22 is placed against the substrate (such as panelling) to be fastened at precisely the same point at which a fastener enters the substrate during driving of the fastener by the fastening tool. In addition, the positive placement system has a compact arrangement that provides improved accuracy and a reduced probability of damage to the substrate (such as panelling). As the retractable probe 22 totally clears the raceway 36 when retracted, this facilitates the avoidance of any loss of power which may otherwise be as a result of contact between a fastener travelling through the raceway and the retractable probe. Moreover, example embodiments of the present disclosure can include an incorporated depth of drive so that there is a constant and consistent protrusion of the probe regardless of the depth of drive.

The present disclosure may be particularly suitable where longer fasteners are used, where a harder substrate is used (requiring full power), and where decorative cladding is used such that accuracy is imperative. In comparison with other cladding which may be repaired by way of filler and painting, decorative cladding is in some instances unable to be repaired in this way such that decorative cladding needs to be discarded if it is damaged during fastening.

While various embodiments of the present disclosure have been described above, it should be understood that they have been presented by way of example only, and not by way of limitation. It will be apparent to a person skilled in the relevant art that various changes in form and detail can be made therein without departing from the spirit and scope of the present disclosure. Thus, the present disclosure should not be limited by any of the above-described exemplary embodiments.

LIST OF REFERENCE NUMERALS

Apparatus for driving fasteners 10
Cylinder 12
Driving piston 14
Coil feed 16
Guidance system 18
Positive placement system 20
Retractable probe 22
Lower work contact 24
Slot 26
Lever 28
Low-pressure spring 30
Wedge 32
Nose casting 34
Raceway 36
Housing 38
Indentation 40
Carrier 42
Guiding ears 44

Crossbar 46

The invention claimed is:

1. An apparatus for driving fasteners, the apparatus comprising:

a cylinder;

a driving piston configured to drive a fastener into a substrate, the piston moveable relative to the cylinder;

a coil feed configured to receive a plurality of fasteners including the fastener; and a guidance system configured to guide the apparatus relative to the substrate, the guidance system including a positive placement system that includes:

a retractable probe positionable at a receiving location relative to the substrate and including a first crossbar and a second crossbar;

a lower work contact that defines a bore and a first slot configured to receive the first crossbar of the retractable probe such that the first crossbar of the retractable probe is slidable longitudinally rearward in the first slot and away from the substrate as the fastener is driven at the receiving location;

a wedge;

a spring connected at a first end to the wedge; and a lever having a body, a first protrusion connected to a first surface of the body, and a second protrusion connected to a second surface of body opposite the first surface, wherein the first protrusion is configured to be received by the bore of the lower work contact to enable the body to pivot about the first protrusion, wherein the body defines a second slot configured to receive the second crossbar of the retractable probe such that the second crossbar of the retractable probe is slidable in the second slot, and wherein the second protrusion is configured to connect to the spring at a second, opposing end of the spring.

2. The apparatus of claim 1, wherein the retractable probe is retractable to make way for the fastener to be driven at the receiving location.

3. The apparatus of claim 2, wherein the fasteners are stored in a coil formation in a fastener housing of the coil feed.

4. The apparatus of claim 2, wherein the retractable probe is positionable to clear a raceway of the apparatus, thereby making way for the fastener to be driven.

5. The apparatus of claim 4, wherein the positive placement system includes a mechanism configured to align the raceway with a center of a hole configured to receive the fastener and to progressively move the retractable probe rearward then upward to avoid damage to the substrate.

6. An apparatus for driving fasteners, the apparatus comprising:

a guidance system configured to guide the apparatus relative to a substrate, the guidance system including a positive placement system, the positive placement system including:

a retractable probe configured to be placed on a receiving location of a substrate to locate the apparatus relative to the substrate and including a first crossbar and a second crossbar, wherein the retractable probe is retractable to make way for the fastener to be driven at the receiving location;

a lower work contact that defines a bore and first slot configured to receive the first crossbar of the retractable probe such that the first crossbar of the retractable probe is slidable longitudinally rearward in the first slot and away from the substrate as the fastener is driven at the receiving location;

a wedge;

a spring connected at a first end to the wedge; and a lever having a body, a first protrusion connected to a first surface of the body, and a second protrusion connected to a second surface of body opposite the first surface, wherein the first protrusion is configured to be received by the bore of the lower work contact to enable the body to pivot about the first protrusion, wherein the body defines a second slot configured to receive the second crossbar of the retractable probe such that the second crossbar of the retractable probe is slidable in the second slot, and wherein the second protrusion is configured to connect to the spring at a second, opposing end of the spring.

7. The apparatus of claim 6, wherein the retractable probe is configured to clear a raceway of the apparatus, thereby making way for the fastener to be driven.

8. The apparatus of claim 7, wherein the positive placement system includes a mechanism configured to align the raceway with a center of a hole configured to receive the fastener and to progressively move the retractable probe rearward then upward to avoid damage to the substrate.

9. The apparatus of claim 8, wherein the guidance system is configured to guide a fastener to an exact location where the retractable probe was at a time of initial abutment with the substrate.

10. The apparatus of claim 8, wherein the wedge is configured to assist raising of the retractable probe relative to the raceway as the retractable probe is moved rearwardly.

11. The apparatus of claim 10, wherein the wedge includes a ramped surface and a flat surface.

12. The apparatus of claim 10, wherein said mechanism includes a lever and a spring.

* * * * *